United States Patent [19]

Dierickx et al.

[11] Patent Number: 5,352,741

[45] Date of Patent: * Oct. 4, 1994

[54] ADHESIVE COMPOSITION

[75] Inventors: Etienne L. Dierickx, Aalst; Noel M. M. Overbergh, Rotselaar, both of Belgium

[73] Assignee: N.V. Raychem S.A., Belgium

[ * ] Notice: The portion of the term of this patent subsequent to Oct. 23, 2007 has been disclaimed.

[21] Appl. No.: 895,569

[22] Filed: Jun. 5, 1992

Related U.S. Application Data

[63] Continuation of Ser. No. 302,497, Jan. 27, 1989, abandoned.

[30] Foreign Application Priority Data

Jan. 27, 1988 [GB] United Kingdom ............... 8801813

[51] Int. Cl.$^5$ .................................. C08L 77/00
[52] U.S. Cl. ........................... 525/183; 525/178
[58] Field of Search ............................ 525/183

[56] References Cited

U.S. PATENT DOCUMENTS

| | | | |
|---|---|---|---|
| 3,646,154 | 2/1972 | Marens | 260/857 L |
| 4,018,733 | 4/1977 | Lopez et al. | 525/113 |
| 4,284,542 | 8/1981 | Boyce | 260/27 R |
| 4,517,340 | 5/1985 | Read | 525/113 |
| 4,965,320 | 10/1990 | Overbergh | 525/207 |

FOREIGN PATENT DOCUMENTS

| | | | |
|---|---|---|---|
| 1130494 | 8/1984 | Canada | C08L 77/00 |
| 0028927 | 5/1981 | European Pat. Off. | C23F 15/00 |
| 0040926A | 12/1981 | European Pat. Off. | C09J 3/16 |
| 2062654B | 5/1981 | United Kingdom | C08L 25/08 |
| 2104800A | 3/1983 | United Kingdom | B32B 1/08 |

*Primary Examiner*—Ana L. Carrillo
*Attorney, Agent, or Firm*—Herbert G. Burkard; A. Stephen Zavell

[57] ABSTRACT

An adhesive composition particularly useful for bonding a heat-recoverable polymeric sleeve around a cable splice to form a cable splice case comprises a polyamide and a copolymer of ethylene and an ester of an ethylenically unsaturated carboxylic acid, said copolymer having a melt flow index of at least 40 as measured according to ASTM D12380-70; the amount of copolymer being at least 38% based on the weight of the polyamide.

16 Claims, No Drawings

ADHESIVE COMPOSITION

This application is a continuation of application Ser. No. 07/302,497, filed Jan. 27, 1989 now abandoned.

The present invention relates to an adhesive composition, particularly to a hot-melt adhesive composition containing polyamide and being suitable for use in the cable accessories or pipe line industry, particularly for adhesion to non-flame-brushed polyethylene and/or lead.

Environmental protection frequently has to be provided around substrates such as cables to protect them from contaminants such as moisture. An excellent way of providing such protection is to surround the substrate with an adhesive composition, conveniently applied as a coating on a dimensionally-recoverable, preferably heat-shrinkable sleeve. Such a sleeve may be positioned around the substrate and heated causing the adhesive composition to become molten or softened and causing the sleeve to shrink, driving the adhesive into bonding engagement with the substrate. The sleeve itself may of course provide environmental protection, and the quantity of adhesive required may be reduced by coating the sleeve at only its edges to provide a bond to the substrate.

A specific instance where environmental protection is required is around a cable splice, particularly in a multicore telecommunications cable, where missing cable sheath (removed in order to form the splice) has to be made good. This may be done by installing a liner around the splice, the liner preferably being shaped to provide a smooth transition between the bulky splice and the smaller diameter cable or cables that enter and leave it. The liner is then surrounded by a heat-recoverable sleeve that extends past each end of the liner down onto contact intact cable jacket. The sleeve is internally coated with a hot-melt adhesive composition and, when heated, it shrinks down and becomes bonded to each cable jacket and to the liner between them. In this way leak paths from the outside environment into the now-formed splice case are avoided, and the conductors of the cable protected from moisture etc.

Such splice cases may be expected to provide an environmental barrier for the life-time of the cable, say at least twenty-five years. The cable, and splice case, may be subjected to temperature variations ranging from say −40° C. in winter to say '70° C. in the case of a cable exposed to direct sunlight, and the cable may be internally pressurized. As will be appreciated, these requirements of life-time, temperature and pressure put severe demands on the performance of the adhesive. The problem is made more difficult because, for practical purposes, a given product may have to be suitable for many different environments, for example around buried cables in cold countries, and aerial cables in hot-countries.

These performances requirements are themselves difficult to achieve at an acceptable price, but the difficulty can be seen to be particularly acute when one considers installation conditions. Installation is at present carried out by heating the sleeve and consequently the adhesive with an open-flame torch, although electrical heating may be used. It is clearly desirable that the amount of heat required to soften the adhesive be kept to a minimum. The weather may be cold, there may be little room in a man hole for vigorous heating, an electrical heater may have limited power, and the cable or the sleeve may be damaged by high temperatures etc. Thus, there is a maximum acceptable installation temperature. Also, as noted above there is a wide temperature range over which the adhesive must retain its adhesive power. Unfortunately, the maximum allowable installation temperature is not very much higher than the minimum acceptable upper limit to the range of service temperatures. We have found therefore that our adhesive should have a sharp melt transition.

In addition to a sharp melt transition, the adhesive should have a high peel strength to polyethylene, preferably both flame-brushed and non-flame-brushed, and to lead, it should have good low temperature impact strength, and low temperature flexibility, and it should have low viscosity at the installation temperature say at 160° C.

Attempts have been made to formulate adhesive compositions that combine, for example, high impact strength and high peel strength over a wide temperature range. The following adhesive compositions based on polyamides may be noted.

U.S. Pat. No. 4,018,733 (Lopez, Glover and Lyons) discloses a hot-melt adhesive composition comprising a compatible mixture of: (a) an acidic polymer of ethylene having an acid number ranging from about 3 to about 80 selected from the group consisting of a terpolymer of ethylene, and ethylenically unsaturated mono- or di-carboxylic acid and a vinyl ester of $C_1$ to $C_6$ aliphatic carboxylic acid and a copolymer of ethylene and a $C_2$ to $C_{20}$ aliphatic ester of a monoethylenically mono- or di-carboxylic acid wherein a portion of the carboxlic acid moieties of the said mono- or di-carboxylic acid component are not esterified, and (b) a polyamide having an amine number ranging from about 70 to about 400 with a tackifying agent wherein said tackifying agent is present in an amount ranging from about 3 to about 20 parts by weight per 100 parts of (a) and (b) together, components (a) and (b) being present in a relative proportion by weight ranging from about 40:60 to 60:40.

EP 0040926 (Raychem) discloses a hot-melt adhesive composition comprising a polyamide based in one or more dimeric fatty acids and an ethylene/acrylic acid/butyl acrylate terpolymer containing free carboxylic acid groups. The acid terpolymer is preferably present at an amount of less than 20% by weight based on the weight of the polyamide.

GB 1563030 (Allied Chemical Corporation) discloses a hot-melt adhesive composition comprising a compatible admixture of:

(a) 15 to 99 weight percent of a polyamide adhesive based component; and correspondingly (b) 85 to 1 weight percent of a normally solid, homogeneous component of ethylene and an unsaturated carboxylic acid having an acid number of at least 70 and a number average molecular weight between 500 and 5000, said copolymer containing at least a major proportion of ethylene by weight, said percentages being by weight of (a) plus (b).

We have now formulated an adhesive composition that can provide excellent peel strength to polyethylene, can have excellent low temperature impact strength and flexibility, and can be produced at reasonable cost. The new adhesive also can allow good installability due to low viscosity at installation temperatures. We have found that an ethylene copolymer of high melt flow index can be blended with suitable quantities of one or more polyamides to produce the desired properties.

Thus, the present invention provides an adhesive composition comprising a blend of
(a) (at least one) polyamide; and
(b) copolymer of ethylene and an ester of an ethylenically unsaturated carboxylic acid, said copolymer having a melt-flow index of at least 40, preferably at least 70, especially from 100–300, as measured according to ASTM D1238-70; the amount of the copolymer being at least 38%, preferably from 38–126% based on the weight of the polyamide.

The composition may additionally comprise other components for example for controlling viscosity or flow temperatures or adhesive strength. A preferred further component comprises a ethylene acrylic acid copolymer, (which can help control viscosity or flow temperature), which is preferably present up to 57% based on the weight of the polyamide, and is preferably less than 20% based on the weight of the composition, more preferably less than 15%, especially less than 10%, say 3–7% particularly when low acidity is desired. Other components may comprise Versamid 100 (trade mark for polyamide of Schering), tackifiers, such as a terpene phenol, for example that known by the trade mark SP553 (Schenetady Corp.) or, polyisobutylene and antioxidants such as that known by the trade mark Irganox 1010 (Ciba Geigy). We prefer that the composition has substantially no vinyl acetate nor vinyl acetate copolymer content.

A preferred composition comprises:
(a) from 35–65, preferably 50–60, especially 53–56 parts by weight of one or more polyamides;
(b) from 25–44, preferably 25–35, especially 27–31 parts by weight of one or more copolymers of ethylene and an ester, particularly poly(ethylene ethylacrylate) and/or poly(ethylene butylacrylate);
(c) from 5–20, preferably 10–15, especially 12–15 parts by weight of ethylene acrylic acid copolymer; and
(d) from 0–4, preferably 1–4, especially 1–3 parts by weight of a vinyl terminated rubber, particularly vinyl terminated butadiene nitrile rubber.

The or each polyamide preferably has a ring and ball softening point according to ASTM E28 of from 80°–120° C., more preferably from 90°–110° C., a molecular weight of from 2000–10000, and a viscosity at 210° C. according to ASTM D3236 of 2–8, preferably 3–5 Pa.s. and an amine number from 50–400. Suitable polyamides include those known by the trade marks Macromelt 6735 (Henkel), Macromelt 6766 (Henkel) and Macromelt 6301 (Henkel). In general, a polyamide (or blend of polyamides) may be chosen that has the desired physical and chemical properties (for example melt flow index, softening point, viscosity, and adhesive strength) substantially similar to those of the quoted examples. Two (or more) polyamides may be chosen particularly where low temperature flexibility is required, especially in combination with low cost.

The copolymer of ethylene and an ester preferably contains only two comonomers, and we preferably substantially exclude terpolymers from the composition, although if the terpolymer is carefully selected it may be acceptable. The terpolymer content is preferably less than 10% by weight based on the weight of the polyamide. Preferred copolymers have a ring and ball softening point according to ASTM E28 of 80°–125° C., especially 95°–120° C. Examples of preferred copolymers and acceptable terpolymers include: poly(ethylene ethylacrylate), such as those known by the trade marks Lotader 8200 (Companie de France), Lotader 7500 (Companie de France), EA 89821 (USI) and Alathon 704 (DuPont); and poly(ethylene butylacrylate), such as that known by the trade mark Lotader HX 8280 (Companie de France). (Lotader 7500 and 8200 are terpolymers that additionally contain maleic anhydride.) As with the polyamide, other copolymers can be used having similar physical and chemical properties to those quoted.

Where a ethylene acrylic acid copolymer is used, we prefer that known by the trade mark Alathon 5120 (DuPont) or AC5120 (Allied Chemical Corporation) or equivalents.

We have identified a problem that may occur when using some prior art adhesives, and that may be solved with the present invention.

Adhesion may be poor to certain materials, particularly metals, such as that used for lead cables in Belgium. We have noticed that the lead used for Belgian cables is substantially pure and therefore soft. As a result of this softness, and as a result of a disparity between the thermal coefficient of expansion of adhesives and of lead, thermal cycling may cause cohesive failure of the lead: a very thin surface layer of the lead may peel away from the bulk. The problem is less likely to occur with harder lead compositions, for example those containing impurities or additives such as antimony, copper, silver or tin. The skilled man will be able to determine where there is a risk that this problem will occur, but typically at risk are lead compositions having a melting point as determined by differential scanning calorimetery at 8 degrees centigrade per minute of at least 322 degrees centigrade. An alternative indication (which applies to lead and to other metals and other materials) is hardness: a Vickers hardness of less than 5.5, preferably less than 5.0 microns may lead to poor bonding, the measurement being made on Leitz Miniload equipment using a 100 gm core.

Recognition of this possible failure mode has led us to reduce the acidity of our adhesive composition and thereby reduce stress on cycling at the adhesive/lead interface. This may be done by, for example, reducing the acidity of say AC 5120 (ethylene acrylic acid copolymer) itself. In one embodiment AC 5120 (ethylene acrylic acid copolymer) may be at least partially replaced by SP 553 (a trade mark of Schenectady, France, for a tackifier), and/or by AC 540 (a trade mark for a polyethylene acrylic acid copolymer of Allied Chemical Corporation). AC 540 (ethylene acrylic acid copolymer) has a lower concentration of acid functionality than AC 5120 (ethylene acrylic acid copolymer). Often components which may be added include Oppanol B-12 (a trade mark for polyisobutylene of BASF). Peel strengths at room temperature of at least 100N/25 mm, generally at least 150N/25 mm especially at least 170N/25 mm to Belgian lead can be achieved after 10 temperature cycles from −40 degrees centigrade to +60 degrees centigrade.

The primary components selected, and their relative amounts, and any further components such as viscosity or flow modifiers are preferably such as to achieve a peel strength to non-flame brushed polyethylene, preferably also to lead, of at least 100N/25 mm at room temperature (test QAPK027), a ring and ball softening temperature of 90°–110° C. (test ASTM E28), a viscosity at 160° C. of 40–110 Pa.S (test ASTM D3236), a low temperature mandrel flexibility of −30° C. or lower, and an impact brittleness of −30° of lower (test ISO 974).

The adhesive composition may be provided with, preferably as a coating on, a dimensionally-recoverable, preferably heat-shrinkable article. The article may comprise a sleeve, which may be tubular or of the wrap-around type, such as that disclosed in UK Patent 1155470 (Raychem). We particularly prefer that the sleeve or other recoverable article comprises a recoverable composite material recoverable by virtue of a recoverable fabric component thereof. The recoverable fibre may be part of a recoverable fabric, such as one that comprises a weave of recoverable fibres in one direction and dimensionally stable fibres in another direction. We prefer that the recoverable fibres comprise polyethylene and that the stable fibres comprise glass. The composite material may comprise recoverable fibres and a matrix material, such as polyethylene, by means of which the composite is rendered substantially impermeable. The matrix material is preferably such that the adhesive composition is able to bond thereto.

Where a branched cable splice is to be environmentally sealed by means of a sleeve, a branch-off clip may be applied to an end of the sleeve to hold together circumferentially-spaced portions of the sleeve between the branching cables. The use of such a clip to bring together such portions of a recoverable sleeve is disclosed in GB 1604981. Such a clip may have three legs, the outer two lying outside the sleeve, and an inner lying within the sleeve, generally between the branching cables. The branch-off seal formed using such a clip may be enhanced if an inner leg of the clip comprises an adhesive, and the adhesive of the invention may be used for such purpose. The adhesive may provide substantially the whole of the inner leg, or may provide a coating over a heat-conducting or other support.

The adhesive of the invention may be supplied separately from any sleeve instead of or in addition to the sleeve coating as mentioned above. For example, such adhesive may be supplied in strip form for wrapping around a cable prior to installation of a recoverable sleeve or other cable enclosure.

The invention is further illustrated by the following examples.

EXAMPLE 1

An adhesive composition was made by mixing in a blend mixer the following materials:

| Macromelt 6301 (polyamide) | 93 parts by weight |
| VTBNX (vinyl-terminated butadiene nitrile rubber) | 5 parts by weight |
| Antioxidant | 2 parts by weight |

Sixty parts by weight of the resulting first blend were mixed with 35 parts by weight of ethylene ethylacrylate (Alathon 704) and 5 parts by weight of polyethylene acrylic acid (AC5120).

The resulting adhesive composition was then laminated onto a heat-recoverable composite comprising a weave of recoverable high density polyethylene in the weft and glass fibres in the warp having a matrix material of low density polyethylene. The lamination was carried out to a thickness of 0.4 mm using a belt laminator.

A wrap-around sleeve was formed from the resulting coated composite by forming at edge regions thereof closure members that could be held together by a C-shaped channel, as disclosed in EP 0116392 (Raychem). The sleeve was then heat-shrunk around a polyethylene cable splice of 1 in 3 out configuration, using a branch-off clip between the branching cables. The size of the sleeve was that known by Raychem's trade mark VASM 4/6. The sleeve was tested for leaks on a pressure/temperature cycle at 40 KPa from −40° C. to +60° C. at 3 cycles per day. Excellent performance was noted.

The adhesive composition of this example had a viscosity at 160° C. of 80.7 Pa.S, and a ring and ball softening point of 102° C.

Viscosity was determined according to ASTM D-3236-1978, using a Brookfield Model HBT, Spindle SC-27 at 160° C. at a shear rate of 5 rpm. The softening point was determined by the ring and ball method according to ASTM E28-1977. The sample preparation being by the pour method, at a heat-up speed of 5° C./minute.

EXAMPLE 2

Example 1 was repeated, but using the following components:

| First blend | 42.5 parts by weight |
| Alathon 704 (poly(ethylene ethylacrylate) | 40 parts by weight |
| AC 5120 (ethylene acrylic acid copolymer) | 17.5 parts by weight |

Viscosity at 160° C. was 44 Pa.S, and the softening point was 98° C.

EXAMPLE 3

Example 1 was repeated, but using the following components;

| First blend | 50 parts by weight |
| Alathon 704 poly(ethylene ethylacrylate) | 38 parts by weight |
| AC 5120 (ethylene acrylic acid copolymer) | 12 parts by weight |

Viscosity at 160° C. was 67 Pa.S, and softening point was 105° C. Peel strength at room temperature to non-flame-brushed polyethylene averaged 167N/25 mm determined according to QAPK 027.

EXAMPLE 4

Example 1 was repeated, but using the following components:

| Macromelt 6301 (polyamide) | 46.5 parts by weight |
| VTBNX (vinyl-terminated butadiene nitrile rubber) | 2.5 parts by weight |
| Antioxidant | 1 part by weight |
| Alathon 704 (poly(ethylene ethylacrylate) | 38 parts by weight |
| AC 5120 (ethylene acrylic acid copolymer) | 12 parts by weight. |

Viscosity at 160° C. was 56.5 Pa.s, and the softening point was 104° C. Peel strength at room temperature to non-flame-brushed polyethylene averaged 120N/25 mm.

EXAMPLE 5

Example 1 was repeated, but using the following components:

| | |
|---|---|
| Macromelt 6301 (polyamide) | 46.5 parts by weight |
| Antioxidant | 1 part by weight |
| Lotader HX 8280 | 38 parts by weight |
| AC 5120 | 12 parts by weight |
| VTBNX (vinyl-terminated butadiene nitrile rubber) | 2.5 part by weight |

Viscosity at 160° C. was 63.1 Pa.s, and the softening point was 99° C. Peel strength at room temperature to non-flame-brushed polyethylene was 301N/25 mm.

EXAMPLE 6

Example 1 was repeated but using the following components

| | |
|---|---|
| Macromelt 6301 (polyamide) | 54.4 parts by weight |
| VTBNX (vinyl-terminated butadiene nitrile rubber) | 2 parts by weight |
| Antioxidant | 1 part by weight |
| Lotader HX 8280 (poly(ethylene butylacrylate) | 29 parts by weight |
| AC 5120 (ethylene acrylic acid copolymer) | 13.6 parts by weight |

Viscosity at 160° C. was 58 Pa.s, and softening point was 99° C. Peel strength at room temperature to non-flame-brushed polyethylene was 386N/25 mm.

EXAMPLE 7

Example 1 was repeated but using the following components.

| | |
|---|---|
| Macromelt 6301 (polyamide) | 50 parts by weight |
| VTBNX (vinyl-terminated butadiene nitrile rubber) | 2 parts by weight |
| Antioxidant | 1 part by weight |
| Lotader HX 8280 (polyethylene butylacrylate) | 37 parts by weight |
| AC 5120 (ethylene acrylic acid copolymer) | 10 parts by weight |

Viscosity at 160° C. was 89 Pa.S, and the softening point was 96° C. Peel strength at room temperature to non-flame-brushed polyethylene was 277N/25 mm.

EXAMPLE 8

Example 1 was repeated but using the following components.

| | |
|---|---|
| Macromelt 6301 (polyamide) | 60 parts by weight |
| Antioxidant | 1 part by weight |
| Lotader 8600 B (polyethylene butylacrylate copolymer) | 19 parts by weight |
| Oppanol B-12 (polyisobutylene) | 10 parts by weight |
| SP 553 (a tackifier) | 5 parts by weight |
| AC 540 (ethylene acrylic acid copolymer) | 5 parts by weight |

(Lotader 8600 B (polyethylene butyl acrylate copolymer) is a trade mark of Companie de France for polyethylene butyl acrylate copolymer.)

The resulting composition, which can be seen to contain no AC 5120 (polyethylene acrylic acid copolymer), had a viscosity at 160° C. of 77.5 Pa.S, and at 200° C. of 28.1 Pa.S. Its ring and ball softening point was 101.4° C. Peel strength to flame-brushed polyethylene at room temperature was 438.2N/25 mm. Peel strenth to Belgian lead cable at room temperature after temperature cycling of 10 cycles from −40° C. to +60° C. was 183N/25 mm, and before cycling it was 192N/25 mm. Such values are surprisingly different from those for compositions containing large quantities of AC 5120, where the peel strength to Belgian lead drops substantially to zero.

The quantity of these components may, of course, be varied. The Oppanol B-12 is preferably present from 5–10 parts, the SP 553 from 0–7 parts, and the Lotader from 15–25 parts. Preferably the relative amounts are as follows: Lotader/Oppanol/SP 553 3.8–4.2: 1.8–2.2: 0.8–1.2.

EXAMPLE 9

Example 1 was repeated but using the following components.

| | |
|---|---|
| Macromelt 6301 (polamide) | 60 parts by weight |
| Antioxidant | 1 part by weight |
| Lotader 8600 B (polyethylene butylacrylate copolymer) | 19 parts by weight |
| Oppanol B-12 (polyisobutylene) | 10 parts by weight |
| SP 553 (a tackifie) | 5 parts by weight |
| AC 5120 (ethylene acrylic acid copolymer) | 5 parts by weight |

The resulting composition, which can be seen to contain less AC 5120 (polyethylene acrylic acid copolymer) than the early examples, had a viscosity at 160° C. of 64 Pa.S and at 200° C. of 19.2 Pa.S. Its ring and ball softening point was 99.8° C. Peel strength to flame brushed polyethylene at room temperature was 400° C. Peel strength to Belgian lead cable at room temperature after temperature cycling of 10 cycles from −40° C. to +60° C. was 175N/25 mm, and before cycling it was 201N/25 mm.

The retention of some AC 5120 may be desirable in order to achieve a low viscosity and high peel strength to lead.

For the avoidance of doubt, it is here stated that the invention provides an adhesive composition, and an article particularly a recoverable article having such a composition, that exhibits the properties mentioned herein as desirable. Any of the components mentioned herein may be selected to achieve these properties, particularly the selection of an acid copolymer with a high melt flow index, together with a polyamide, the high melt flow index of the copolymer allowing it to be used at high relative amounts based on the amount of the polyamide, and inclusion of other components such as viscosity or melt flow temperature modifiers, rubbers and antioxidants, etc.

We claim:

1. An adhesive composition comprising a blend of:
   (a) polyamide; and
   (b) copolymer of ethylene and an ester of an ethylenically unsaturated carboxylic acid, said copolymer having a melt flow index of at least 40 as measured according to ASTM D1238-70; the amount of the copolymer being at least 38% based on the weight of the polyamide.

2. An adhesive composition according to claim 1, which additionally comprises an ethylene acrylic acid copolymer.

3. An adhesive composition according to claim 2, in which the amount of the ethylene acrylic acid copolymer is less than 20% based on the weight of the composition.

4. An adhesive composition according to claim 1, which additionally comprises a tackifier.

5. An adhesive composition according to claim 3, comprising:
   (a) from 35–65 parts by weight of polyamide;
   (b) from 25–44 parts by weight of copolymer of ethylene and an ester; and
   (c) from 5–20 parts by weight of ethylene acrylic acid copolymer.

6. An adhesive composition according to claim 1, in which said copolymer of ethylene and an ester comprises poly(ethylene ethylacrylate) or poly(ethylene butylacrylate).

7. An adhesive composition according to claim 1, in which the polyamide, or, if more than one polyamide is present, each polyamide (a) has a ring and ball softening point according to ASTM E28 of from 80°–120° C.

8. An adhesive composition according to claim 1, in which the polyamide, or, if more than one polyamide is present, each polyamide (a) has a viscosity at 210° C. according to ASTM D3236 of 2–8 Pa.s.

9. An adhesive composition according to claim 1, in which the melt flow index of copolymer (b) is at least 70.

10. An adhesive composition according to claim 9, in which the melt flow index of copolymer (b) is from 100–300.

11. An adhesive composition according to claim 9, in which copolymer (b) has a ring and ball softening point according to ASTM E28 of 80°–125° C.

12. An adhesive composition according to claim 1, having a viscosity according to ASTM D3236 at 160° C. of from 40–110 Pa.s.

13. An adhesive composition according to claim 1, having a ring and ball softening point according to ASTM E28 of 90°–110° C.

14. An adhesive composition according to claim 1, having a peel strength at room temperature to non-flame-brushed polyethylene of at least 100N/25 mm.

15. An adhesive composition according to claim 1, having a peel strength at room temperature after 10 temperature cycles from −40° to +60° C. to substantially pure lead of at least 100N/25 mm.

16. An adhesive composition according to claim 1, which additionally comprises one or more viscosity or melt flow index modifiers.

* * * * *

UNITED STATES PATENT AND TRADEMARK OFFICE
CERTIFICATE OF CORRECTION

PATENT NO. : 5,352,741
DATED : October 4, 1994
INVENTOR(S) : Dierickx et al

It is certified that error appears in the above-indentified patent and that said Letters Patent is hereby corrected as shown below:

On the title page: Item [56]
References Cited, U.S. Patent Documents, before "4,517,340", insert, as a new line --4,379,887, 4/1983, Overbergh, 525/184--.

Column 1, line 37, delete "contact".

Column 1, line 48, replace "'70°C." by --+70°C.--.

Column 4, line 47, after "polymer)", insert --or by replacing or reducing the amount of the AC 5120--.

Column 7, Example 5, Table, line 4, after "AC 5120", insert --(polyetylene acrylic acid copolymer)--.

Column 10, line 7,
Claim 11, replace "claim 9" by --claim 1--.

Signed and Sealed this

Fourth Day of April, 1995

Attest:

BRUCE LEHMAN

Attesting Officer            Commissioner of Patents and Trademarks